United States Patent Office 3,378,608
Patented Apr. 16, 1968

3,378,608
ELASTOMERIC ALPHA OLEFIN BLOCK COPOLYMERS
Howard L. Hassell, San Leandro, Calif., assignor to Shell Oil Company, New York, N.Y., a corporation of Delaware
No Drawing. Filed Dec. 20, 1963, Ser. No. 332,246
6 Claims. (Cl. 260—878)

ABSTRACT OF THE DISCLOSURE

A self curing elastomeric block copolymer having the configuration:

C—A—B—A wherein C is a copolymer block of two alpha olefins each olefin being present in an amount of at least 8 mole percent, each A is a non-elastomeric alpha olefin polymer block and B is an elastomeric copolymer block of ethylene with a higher alpha olefin. The invention also covers a novel method of making such a block copolymer employing a catalyst consisting of vanadium diisopropyl salicylate and aluminum ethyl dichloride.

---

This invention relates to elastomeric block copolymers of alpha olefins. More particularly, it is concerned with the preparation and products having the characteristics of a vulcanized elastomer.

The polymerization of alpha olefins can lead to either products having the characteristics of thermoplastics, e.g., polyethylene or polypropylene, or to elastomers, such as ethylene-propylene rubbers. Such materials are greatly affected by the specific catalyst system used insofar as the stereoregularity of the product is concerned and, thereby, the properties of the product.

Block copolymers of alpha olefins have been produced by the periodic injection of several types of alpha olefins resulting in block copolymers having properties somewhat different from random copolymers achieved by polymerization of mixture of the two monomers. However, the products so obtained are either those of the thermoplastic type or of the elastomeric type requiring vulcanization to achieve their maximum stress-strain properties.

Vulcanization of alpha olefins presents numerous problems which have not been satisfactorily solved at the present time. While vulcanization is possible, the vulcanization recipes are either elaborate or expensive or the products so produced have exceedingly bad odor, and other disadvantages are usually encountered.

It would be of special benefit to obtain an alpha olefin polymer having optimum elastomeric properties without the necessity of vulcanizing and at the same time, a "self-vulcanizing" rubber which has a minimum of unsaturation, thus promoting its thermal and oxidative stability. Up to the present time, however, such products have not been achieved due to the lack of proper relationship of the individual alpha olefin blocks within a given block copolymer or to the solubility properties encountered during the polymerization process itself.

One of the major difficulties encountered in the preparation of block copolymers of alpha olefin is that of maintaining the growing polymer chain as formed in a physical state capable of continuing the polymerization without having the polymer settle out or adhere to the sides or surfaces of the vessel in which the polymerization is being conducted. If this occurs, it is physically difficult for any added olefin to be intimately contacted with the body of the polymer and, in effect the polymerization of that particular polymer chain stops at that time. Consequently, in previous preparation, the products have been crude mixtures of polymers containing certain amounts of block copolymers, but also substantial proportions of homopolymers which degrade the physical properties of the product when specific properties were initially desired.

The self-vulcanizing characteristics of polymers are economically attractive if they are technically feasible to achieve. When chain die-out or catalyst die-out occurs during the polymerization, the achievement of a desirable self-vulcanizing rubber structure is substantially impossible. The molecular weight relationships of the various blocks of a self-vulcanizing block copolymer are relatively critical and a major portion of the polymerization product must have the required structure if self-vulcanizing is to be obtained. However, when either ethylene or propylene are polymerized with the usual catalyst in hydrocarbon or certain polar medium, the initially formed polymer block exhibits an extremely adherent nature and accumulates on the surfaces of the reactor, thus, interrupting the smooth operation of the block copolymerization process.

It is an object of the present invention to improve the copolymerization of alpha olefins. It is a particular object of the invention to provide an improved process for the production of block copolymers of alpha olefins. It is special object of the invention to provide a self-vulcanizing block copolymer of alpha olefins. Other objects will become apparent during the following detailed description of the invention.

Now, in accordance with the present invention, block copolymers having the properties of a self-curing elastomer having the general configuration

C—A—B—A wherein C is a copolymer block of two alpha olefins, each being present in an amount of at least 8 mol percent (preferably at least 10 mol percent) of the block, said block comprising 2 to 30 weight percent of the total polymer and having an average molecular weight between about 2,000 and about 60,000; each A is a non-elastomeric alpha-olefin polymer block having an average molecular weight between about 4000 and 115,000 and constitutes between about 2 and about 33 percent (preferably 5–20%) by weight of the total copolymer; and block B is an elastomeric copolymer block of ethylene with an alpha olefin having from 3–6 carbon atoms per molecule, said block containing 20 to 92 mol percent of ethylene and having an average molecular weight between about 20,000 and 450,000. The blocks A should comprise in total between about 4 and 66 weight percent of the total copolymer.

Still in accordance with the invention, a process for the production of such polymers is provided wherein the initial block C in the above generalized formula is produced by the use of a vanadium-containing polymerization catalyst and an organo aluminum reducing agent combined therewith in a non-polymerizable organic medium, the proportions of the two alpha olefins utilized in the formation of block C being adjusted such that the polymer product formed is non-adherent to the reactor surfaces and is preferably soluble (but not necessarily so) in the polymerization medium; allowing polymerization to continue until the restricted desirable molecular weight of block C is achieved; sweeping out at least 1 of the alpha olefin monomers which may still be present and injecting substantially a single alpha olefin having from 2–6 carbon atoms per molecule into the system; continuing polymerization until the desired molecular weight of said block is achieved; thereafter injecting a second alpha olefin in a proportion to create an elastomeric copolymer block B; thereafter sweeping out at least one of any of the residual monomers and continuing polymerization in the presence of one of the monomers of a different alpha olefin monomer having from 2–6 carbon atoms per molecule.

The problem involved in the preparation of the subject self-curing block copolymers is that of maintaining a polymerized product throughout the entire course of the copolymerization capable of continuing chain formation or, in other words, one having minimum adherent characteristics and thus creating and maintaining a polymer which does not agglomerate on the surface of the polymerization reactor.

In accordance with the invention, it was observed that the block C, being a copolymer block of restricted average molecular weight, permitted the formation of such a product. At the same time, however, it was necessary to restrict the molecular weight of the block C within the range given hereinbefore so that the self-curing properties of the entire block copolymer would not be adversely affected. The self-curing properties are preferably achieved with the structure

but the difficulty is in obtaining a smooth block configuration in view of the difficulties set forth hereinbefore. Consequently, in accordance with the invention, the copolymer block C is utilized for this purpose but is minimized so as to prevent adverse alteration of the desired properties of the main portion of the block namely of the A—B—A part of the 4-block copolymer.

The type of catalyst employed for the production of these self-curing block copolymers is of importance in obtaining the optimum properties desired for such compositions. While the usual Ziegler catalysts, such as titanium halides and the like may be employed for this purpose together with aluminum halides or aluminum organo halides, these generally lead to products which have a greater stereoregularity than is desired for many elastomeric purposes. Therefore, the preferred type of catalyst are the vanadium based polymerization catalysts used in conjunction with aluminum-containing reducing agents. Preferred among these are two general classes of vanadium compounds, namely, those based upon vanadium salts of salicylic acids and vanadium salts of sulfonic acids. The hydrocarbon radicals making the most effective substituents directly attached to the salicylic acid radical are aliphatic, cycloaliphatic or aromatic as well as mixed types including aryl aliphatic, aryl cycloaliphatic, alkyl aromatic or cycloalkyl aromatic substituents. As a rule, the combined substitutents contain no more than 20 carbon atoms per molecule.

Salicylic acids which contain one or more alkyl groups as substituents in particular those alkyl groups which are linked to the aromatic nucleus by means of a tertiary or a quaternary carbon atom, are preferred. Suitable substituted salicylic acid from which the vanadium salts may be prepared are diisopropyl, di-secondary-butyl, di-tertiary-butyl, tertiary-amyl, ditertiary-amyl, dinormyl-butyl, normyl-hexyl, n-cyclohexyl, n-dodecyl, triisopropyl, and phenyl-salicylic acids.

The preferred vanadium sulfonates are vanadium salts of organic sulfonic acids represented by the general formula

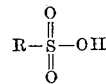

in which R is an aliphatic, cycloaliphatic or aromatic hydrocarbon radical. In the radical R, substituents may be present, for instance one or more aromatic nuclei in an aliphatic radical or 1–4 alkyl groups in an aromatic radical. Further, other substituents may also be present in the radicals, for instance hydroxyl groups, carboxyl groups, alkoxy groups, esterified carboxyl groups, oxygen atoms of carbonyl groups, amino groups, mercapto groups, halogen atoms, a second sulfo group, etc. The aliphatic and cycloaliphatic groups (radicals) may be branched or unbranched, saturated or unsaturated. The aromatic nuclei may be single benzene nuclei or condensed nuclei. As a rule R contains at least 6 and at most 30 carbon atoms. Very good results have been obtained with vanadium salts of mixed alkyl benzene sulfonic acids in which the alkyl group contains 8 to 20 carbon atoms, there being 1–4 alkyl radicals per benzene nucleus.

As examples of reducing agents which, according to the invention, are applied together with the vanadium salts may be mentioned, interalia, metallo-organic compounds e.g., of metals belonging to the 1st up to and including the 4th group of the Periodic System, in particular aluminum alkyl compounds, by preference aluminum dialkylmonohalides, aluminum alkylsesquihalides, aluminum monoalkyldihalides, or mixtures of two or more of these types of alkyl compounds in various ratios. The alkyl groups in these compounds may contain different numbers of carbon atoms, and both branched and unbranched chains. As a rule, alkyl groups containing not more than 12 carbon atoms are applied, alkyl groups with 2 to 6 carbon atoms being preferred. The halogens in these compounds are particularly chlorine and bromine and by preference the former.

As a rule, the hydrocarbon radicals in the aluminum compounds contain no more than about 12 carbon atoms, alkyl groups with at least 2 and at most 6 carbon atoms being preferred. Any halogens which are present in these compounds are in particular chlorine and bromine, preferably the former.

The molecular ratio in which the catalyst components are present has a powerful influence upon both the rate and yield of the polymerization and on the properties of the polymer. In general, the number of atoms of vanadium and the number of aluminum atoms are in a ratio varying from about 0.05:1 and 2:1. In general, the highest yields and most desirable molecular weights are obtained when this ratio is between about 0.05:1 and 0.33:1.

The block copolymerization is conducted in the presence of a hydrocarbon solvent which is essentially inert under the conditions of the polymerization. Alkanes and cycloalkanes such as hexane, cyclohexane or other saturated hydrocarbons having from 4–10 carbon atoms per molecule are preferred solvents for this purpose. Aromatic solvents—benzene, toluene, etc. also can be used as well as some chlorinated alkanes and cycloalkanes.

The polymerization is to be conducted under conditions which will avoid inadvertant termination of the growing polymer chain. This temperature range is usually between about −25° C. and plus 25° C., the preferred range being between about −15° and +15° C. If too low a polymerization temperature is utilized, a partially stereoregular elastomeric copolymer block B is formed which has relatively poor elastomeric properties. Since the principal objective is to achieve an elastomer having self-curing properties, it is important to maintain the maximum of elasticity in this block of the copolymer.

The initial block formed under the conditions outlined hereinbefore plays an essential role in determining the success of the subsequent polymerization. As referred to initially, if the initial block polymer formed is of such a nature that it adheres strongly to the surfaces of the reactor, the subsequent ease of polymerization is reduced substantially. This is purely a physical phenomenon in that the relatively solid agglomerated coating on the surfaces of the reactor is not in such a physical state that subsequently added alpha olefin monomer can readily penetrate therein and take part in continuing polymerization. Consequently, one of the essential features of this invention is to minimize or obviate this adverse set of conditions.

This is effected by initially forming a copolymer block of ethylene with a higher alpha alkene as detailed hereinbefore in such a ratio that the resulting polymer block is either soluble in the reaction medium or forms a flock or loose gel therein, which does not readily adhere to the surfaces of the reactor. If, however, this initial polymer block is allowed to grow to more than the maximum limits specified hereinbefore, the self-curing properties of the eventually formed block copolymer are drastically reduced and the principal objective of the entire block copolymerization is not achieved. Because of this, it is essential to restrict the initial copolymer block to no more than an average molecular weight of about 60,000, and preferably no more than about 15,000 before forming the initial block A in continuing the block copolymerization.

In order to be effective for the formation of the flocculent or soluble initial polymer block, it is necessary to permit polymerization to continue to an extent such that the average molecular weight thereof is at least about 2,000 and preferably at least about 3,500. If the initial copolymer block formed for the purpose of creating the correct physical characteristics to avoid agglomeration is too low, it does not have a sufficient favorable effect in this direction and agglomeration occurs in place of the initial copolymerization. With these two restrictions in mind therefore, the first copolymer block should be within the average molecular weight ranges specified, the molecular weight referred to herein being determined by the usual means of intrinsic viscosity and composition (monomer ratio in the polymer). The intrinsic viscosity (at a given composition) is a function of the weight average or number average molecular weight (Staudinger Equation).

Having formed the initial polymer block as described, the next stage is to sweep at least one of the monomers out of the reactor by inert gas purge, evacuation or by injection of substantial quantities of the monomer to be employed for the formation of the first block A and thereafter injecting sufficient of the single alpha olefin to cause formation of block A as the second block in the 4-block copolymer. In order to achieve the self-curing properties of the desired end product, it is necessary to allow polymerization to continue in the formation of block A only to the range of average molecular weight between about 4,000 and 115,000, preferably between about 8,000 and 60,000. If the average molecular weight of the first block A (or of the second block A) is outside of the specified range, the properties of the polymer are drastically altered either in the direction of forming a thermoplastic having the properties of polyethylene or in the direction of an ordinary ethylene-propylene rubber, neither of which is desired in the present instance.

Polymerization is therefore continued until the specified average molecular weight of this first block A is achieved, after which the monomer (if any remaining) is swept out and/or replaced by the two alpha olefins to be utilized in the formation of the elastomeric block B. This block, as specified hereinbefore, is a copolymer block of ethylene with at least one higher alpha olefin utilized in an ethylene to other monomer molar ratio of between about 9:1 and about 0.25:1 in order to obtain the desired elastomeric properties. Other than controlling this ratio of monomers taking part in the active creation of the elastomeric block B, the conditions of the polymerization are essentially the same as in the formation of block A.

In order to achieve the desired self-curing properties of the eventual block copolymer, it is necessary to restrict the average molecular weight of this elastomeric polymer block to between about 20,000 and 450,000, preferably between about 50,000 and 300,000.

Thereafter, the second block A is created by sweeping out the remainder of block B monomers and replacing them with block A monomer which is essentially a single alpha olefin, preferably either ethylene or propylene. Block copolymerization is continued as described hereinbefore to form the desired average molecular weight, this being within the range specified for the initial block A.

The product of the block copolymerization process is thereafter recovered from the reaction mixture by coagulation if it has formed a solution (cement) with the reaction medium or by filtration if it is in the form of a suspended solid.

The block copolymer now has the desired structure

C—A—B—A and when the average molecular weight of each of the individual blocks are within the ranges specified hereinbefore, the product may be described as a self-curing elastomer. By this is meant that the product has essentially the stress-strain properties of an ordinary rubber without the necessity of going through the vulcanization procedures required with ordinary rubbers. It is preferred that the product having tensile strengths at break in the order of 750–3000 p.s.i. and elongations at break in the order of 300–1000%. Other properties which distinguish a self-vulcanizing block polymer from one which is not self-vulcanizing include the following:

(1) Solubility characteristics—the block copolymer is apt to be less soluble in solvents (hence the reason for the C block)—solvent resistance.

(2) Domain formation—i.e., block polymers have some crystalline aspects.

(3) Processability differs—block polymers are generally harder to process because they are "vulcanized"—also process ability changes rapidly with temperature in the neighborhood of the softening point of the A blocks.

(4) Block copolymers do not creep on standing as some unvulcanized rubbers do.

(5) Block copolymers show less set at break.

(6) Tensile properties (modulus, etc.) of block polymers can be changed over a wide range by varying molecular weight of blocks, relative proportions of blocks and composition of blocks—i.e., tailor the strength properties.

The block copolymers of this invention may be utilized for a wide variety of molding operations utilizing apparatus normally employed for the molding of thermoplastic materials. The compositions may be modified with flow assist agents. It is preferred, however, to restrict the proportions of these agents so as to maintain maximum stress-strain properties in the finished compositions. Fillers may be employed if desired such as those utilized with ordinary rubbers. They may be further modified by the presence of asphalt, wax, polyvinyl compounds such as polystyrene, ordinary polymers of alpha olefins such as polypropylene or polyethylene or may be mixed with either natural or synthetic rubbers such as polyisoprene or polybutadiene.

EXAMPLE I

A block copolymer was prepared from ethylene and propylene in normal heptane at about 0° C., 3 p.s.i.g. pressure. The catalyst was the reaction product of 0.25 mm. vanadium diisopropyl salicylate per liter and 2.5 mm. aluminum ethyl dichloride per liter. Ethylene and propylene were introduced in such a way as to form an initial polymer block C having a mol ratio of propylene to ethylene of about 6.7 until an intrinsic viscosity of 2.7 dl./g. (n-heptane at 0°–10° C.) was obtained. Residual propylene monomer was swept out with ethylene and polymerization continued to form a first major block A of polyethylene, the cumulative intrinsic viscosity at that time being 3.8 dl./g.

Thereafter a mixture of ethylene and propylene was introduced in such proportions as to produce a third polymer block B having elastomeric properties, the block containing approximately 48 mol percent of propylene units until the cumulative intrinsic viscosity was about 4.4 dl./g. Finally, residual propylene was swept out with ethylene, the polymerization being continued only with ethylene until the cumulative intrinsic viscosity was about 5.1 dl./g. The tensile strength of the products so derived was about 1400 p.s.i. and elongation at break was 540%. Modulus of elasticity at 300% was about 350.

Several other block copolymers were made utilizing three times the concentration of catalyst employed in the above preparation. The products obtained were somewhat better in stress-strain properties.

EXAMPLE II

A block copolymer was prepared from ethylene and propylene in n-heptane at about 0° C., 3 p.s.i.g. pressure. The catalyst was the reaction product of 0.75 ml. per liter vanadium diisopropyl salicylate and 7.5 ml. per liter aluminum ethyl dichloride. Ethylene and propylene were introduced to form the C block so that it had a mol ratio of ethylene to propylene of about 13 and a I.V. of 1.4 dl./g. was achieved. After this, the residual propylene was swept out with ethylene and ethylene was continued to be added until a second block of polyethylene had formed giving a cumulative intrinsic viscosity of 2.4 dl./g. Thereafter ethylene and propylene were added to form the B block until the cumulative intrinsic viscosity reached 3.4 dl./g. and the cumulative composition 77 mol percent ethylene. Again, ethylene was used to sweep out the residual propylene and to form the second A block. The final cumulative intrinsic viscosity was 4.6 dl./g. The tensile strength of the coagulated product was 1900 lbs./in.² with an elongation at break of 740%.

EXAMPLE III

The procedure in Example II was repeated varying the amounts of ethylene and propylene added so that the composition of the C block was 84 mol percent ethylene and the cumulative composition of the final product was 81 mol percent ethylene. The final I.V. was 2.5 dl./g., yielding a product with 1525 lbs./in.² tensile strength and 750% elongation at break.

I claim as my invention:

1. A self curing elastomeric block copolymer of at least two alpha olefins having 2–6 carbon atoms per molecule, the copolymer having the general configuration

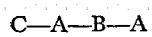

C—A—B—A wherein
 (a) C is a copolymer block of two alpha olefins, each being present in an amount of at least 8 mol percent of the block, said block comprising 2 to 30 weight percent of the total polymer and having an average molecular weight between about 2,000 and about 60,000;
 (b) each A is a non-elastomeric alpha olefin polymer block having an average molecular weight between about 4,000 and about 115,000 and comprising no more than about 33% by weight of the total polymer;
 (c) and B is an elastomeric copolymer block of ethylene with a $C_{3-6}$ alpha olefin, said block containing 20 to 90 mol percent of ethylene and having an average molecular weight between about 20,000 and about 450,000.

2. A block copolymer according to claim 1 wherein
 (a) block C has an average molecular weight between 3500 and about 15,000;
 (b) blocks A each have an average molecular weight between about 8000 and about 60,000; and
 (c) block B contains between 20 and 90 mol percent of ethylene and has an average molecular weight between about 50,000 and about 300,000.

3. A block copolymer according to claim 2 wherein
 (a) blocks C and B are copolymer blocks of ethylene and propylene; and
 (b) blocks A are essentially homopolymer blocks of an alpha olefin having 2–3 carbon atoms per molecule.

4. A block copolymer according to claim 3 wherein blocks A are essentialy homopolymer blocks of ethylene.

5. A block copolymer according to claim 3 wherein blocks A are essentially homopolymer blocks of propylene.

6. In the block copolymerization of alpha olefins to form the block copolymer of claim 1, the steps of
 (a) initially forming copolymer block C in the presence of a polymerization catalyst comprising the reaction product of vanadium diisopropyl salicylate and aluminum ethyl dichloride wherein the number of atoms of vanadium and the number of atoms of aluminum are in a ratio varying from about 0.05:1 to 2:1, the copolymer block being so formed from two alpha olefins having from 2 to 6 carbon atoms per molecule, the block containing at least 10 mol percent of each condensed monomer and having an average molecular weight between about 3500 and about 15,000 and sweeping the unreacted olefins therefrom;
 (b) continuing polymerization with one of the olefin monomers to form first block A, having an average molecular weight between about 4000 and about 115,000 and sweeping the unreacted olefins therefrom;
 (c) continuing polymerization with ethylene and one higher alpha olefin to form an elastomeric polymer block B having an average molecular weight between 20,000 and 450,000 and sweeping the unreacted olefins therefrom; and
 (d) completing the polymerization with a single alpha olefin to form a second polymer block A having an average molecular weight between about 4000 and about 115,000.

References Cited

UNITED STATES PATENTS 3,268,624  8/1966  Jezl et al. _____ 260—878

FOREIGN PATENTS 601,560  2/1960  Italy.

MURRAY TILLMAN, *Primary Examiner.*

GEORGE F. LESMES, *Examiner.*

D. J. BREZNER, M. J. TULLY, *Assistant Examiners.*